Aug. 16, 1938.  F. SCHMIDT  2,126,706

PIPE CONNECTION

Filed Sept. 13, 1937

INVENTOR.
Fritz Schmidt
BY Harness, Dickey & Pierce.
ATTORNEYS.

Patented Aug. 16, 1938

2,126,706

UNITED STATES PATENT OFFICE 2,126,706

PIPE CONNECTION

Fritz Schmidt, Harburg-Wilhelmsburg, Germany, assignor to Metalastik Ltd., Leicester, England, a British firm Application September 13, 1937, Serial No. 163,637
In Germany December 23, 1935

1 Claim. (Cl. 285—90)

The invention relates to a tube connection with rubber-metal parts, and has the purpose of preventing the transmission of sound waves in the tube walls. For tubular piping, and namely that of large dimensions, which, because of numerous connection places has flanges for example, it is known how to vulcanize rubber rings to metal plates and insert them between the tube flanges in such wise as to prevent metallic contact of the separate sections of the piping. A drawback of this type of arrangement is that the rubber rings under the high pressure of the gases or fluids flowing through the tubular piping do not have the necessary resistance that is required to hold the piping in the specified position on the one hand, and on the other hand to protect the rubber rings from too great deformation. The present invention has the advantages of the known arrangements without their drawbacks, in that the tube connection stands up against even higher pressures, great compression and tension stresses, and endures parallel displacement and angular displacement. Even if the rubber rings are destroyed, the connected tubes are prevented from falling apart.

Figure 1:
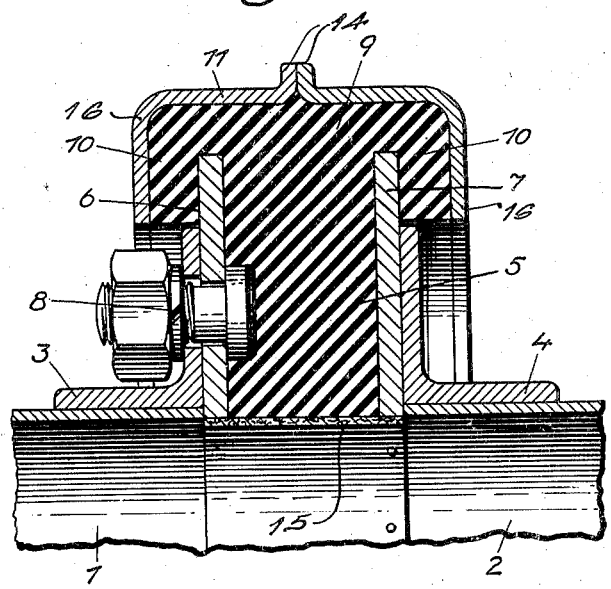
Figure 2:
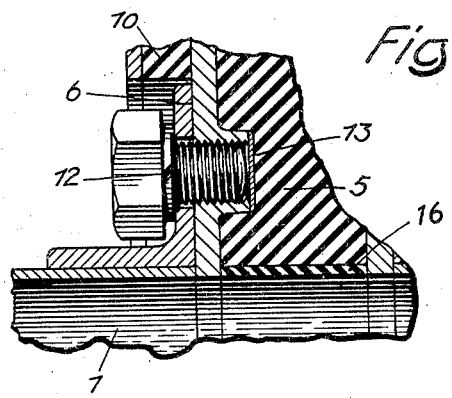

In the drawing, Figures 1 and 2 illustrate two forms of construction of the invention in longitudinal section taken through the tube centerline.

At the ends of the two pipes 1 and 2 that are to be connected together there is inserted in known wise, between the flanges formed for example of angle irons 3 and 4 riveted or welded to the pipes, a ring that consists of a rubber mass 5 with two metal plates 6 and 7 vulcanized to its faces, and fastened by means of the bolts 8 to the flanges (in Fig. 1 these bolts are circumferentially staggered on the two sides). This arrangement with the rubber ring 5 cut off even with the outer periphery of metal plates 6 and 7 is known, but with sufficient pressure inside the tubular piping 1, 2, the rubber mass 5 is forced outward in a convex manner at its outer edge, while the edge at the inside of the piping is forced outwardly in concave manner. The rubber, with sufficiently strong pressures, thereby undergoes great and permanent deformation, which detrimentally affect its strength and decrease its durability.

These drawbacks are avoided, according to the invention, in that the rubber mass 5 extends beyond the outer edges of the sheet metal discs 6 and 7 to which it is vulcanized, and in addition also reaches partly over the outer faces of these discs, as far as the flanges 3 and 4 permit this. These outer parts 9 and 10 of the rubber mass 5 are surrounded by a sheet metal housing 11, which, for the purposes of the vulcanizing process, consists of two symmetrical parts, that have center flanges 14 which may be connected together by riveting, screwing, or welding. This housing also has end flanges 16 that radially overlap the discs and it will be noted that the arrangement and dimensions of flanges, outer housing wall, and discs will prevent separation of the piping even though the rubber should fail.

The subject of the invention behaves in an insulating manner relatively to the transmission of sound waves at the joint of two pipes, as with the arrangements referred to in the preamble, because no metallic contact occurs. In addition to this characteristic, the pressure existing inside the piping 1, 2, is taken by a resistance that far exceeds the strength of the rubber mass by itself, because movement of the rubber mass 5 outwardly, as well as to either side, has narrow limits set to it by the positioning of the metal housing 11 in front of the rubber mass, in that any displacement of individual rubber layers from the inside to the outside necessitates a two-fold alteration in direction of the rubber masses forced to either side. In this wise the actual displacement of the rubber is very trivial in comparison with its size and mass, and the stressing of the rubber can easily be kept below the allowable limits.

A supplementary advantage with the subject of the invention results from the rubber ring 5 also having the action of a compensator for temperature variations in the piping 1, 2, or in the substance flowing through it.

One form of construction of the method of attaching the metal discs 6 and 7, which are vulcanized to the rubber mass 5, to the tube flanges 3 and 4, consists (Fig. 2) in a variation of the arrangement according to Fig. 1, whereby the head of the threaded bolt 8 is vulcanized into the rubber mass 5, along with the metal discs 6 and 7, and female threads are provided, preferably staggered relatively to one another, in which the headed screws 12 may be screwed. In order that the rubber mass 5, which is under considerable pressure during the vulcanization, may not flow into the female threads of the metal discs 6 and 7, these are sealed on the inside with movable cover washers 13. The advantage of this method of screwing consists in that the separate pipe sections 1 and 2 respectively, during assembly with the rubber insulating rings 5 and discs, are not pushed as far apart as in the arrangement according to Fig. 1, wherein the projecting threaded bolts 8 necessitate the flanges 3 and 4 being moved farther apart. It may be noted that the washers may give against the rubber if necessary when the bolts 12 are applied.

In order to procure especially high resistance of the rubber ring 5 against the pressure of the gases or fluids flowing through the piping 1, 2, a sleeve 15 which connects the two metal discs 6 and 7 and which is made of a suitable non-sound conducting material may be disposed inside the piping 1, 2, in such wise that the sleeve is for example fastened to the one metal disc 6, and is slidingly movable relatively to the other metal disc 7. In this wise the sleeve takes the inner pressure or it prevents this pressure from acting on the rubber mass 5, without however being affected by tension and compression stresses of the same that effect a variation in length.

In the event that it is a matter of piping through which rubber-destroying gases or fluids flow, especially oils, the inner surface of the rubber ring 5 may be coated with a layer of oil-resistant rubber, as shown at 16 in Fig. 2.

What is claimed is:

In combination, a pair of aligned tubes having adjacent ends separated, an outwardly directed attaching flange on the end of each tube, centrally apertured discs of larger diameter between the flanges and in contact therewith respectively, rubber between the discs and vulcanized to the adjacent end faces of said discs, said rubber extending outwardly and axially over the outer edges of the discs and then inwardly along the other end faces of the discs to a point adjacent the outer edges of the flanges, a U-shaped housing extending around the rubber and having inturned end flanges radially overlapping the discs and embracing the inturned rubber end portions, and means fastening each flange to the disc adjacent thereto.

FRITZ SCHMIDT.